United States Patent [19]

Henderson et al.

[11] Patent Number: 5,138,942
[45] Date of Patent: Aug. 18, 1992

[54] BELT TYPE ROUND BALER WITH ADJUSTABLE BALE STARTING CHAMBER

[75] Inventors: Steven J. Henderson, Hartford; Curtis M. Lee, Madison, both of Wis.

[73] Assignee: Gehl Company, West Bend, Wis.

[21] Appl. No.: 647,457

[22] Filed: Jan. 28, 1991

[51] Int. Cl.[5] .................... B30B 5/06; A01D 39/00
[52] U.S. Cl. .......................... 100/88; 56/341
[58] Field of Search ............. 100/5, 40, 87, 88; 56/341

[56] References Cited

U.S. PATENT DOCUMENTS

| | | |
|---|---|---|
| 4,121,513 | 10/1978 | Kopaska .................. 100/88 |
| 4,182,101 | 1/1980 | Gaeddert et al. ............ 100/88 X |
| 4,258,619 | 3/1981 | Gaeddert .................. 100/88 |
| 4,336,750 | 6/1982 | White et al. ............... 100/88 |
| 4,422,373 | 12/1983 | Gaeddert .................. 100/88 |
| 4,648,239 | 3/1987 | Geiser et al. ............... 100/88 X |
| 4,731,984 | 3/1988 | van der Lely .............. 100/88 X |
| 4,759,278 | 7/1988 | Viaud ..................... 100/88 |
| 4,782,652 | 11/1988 | White ..................... 100/88 |

FOREIGN PATENT DOCUMENTS 2460099 2/1981 France ..................... 56/341

Primary Examiner—Harvey C. Hornsby
Assistant Examiner—Stephen F. Gerrity
Attorney, Agent, or Firm—Andrus, Sceales, Starke & Sawall

[57] ABSTRACT

A belt type variable chamber round baler includes a starting chamber for receiving crop material at the outset of bale formation. An adjustment mechanism is provided for adjusting the volume of the bale starting chamber, for accommodating baling of various crops. A series of starting chamber rollers are supported between a pair of arms, which are pivotably mounted to the baler. The adjustment mechanism is operable to control the position of the pair of arms prior to bale formation, and thereby the position of the starting chamber rollers within the bale forming chamber of the baler. In this manner, the size of the starting chamber can be adjusted.

15 Claims, 2 Drawing Sheets

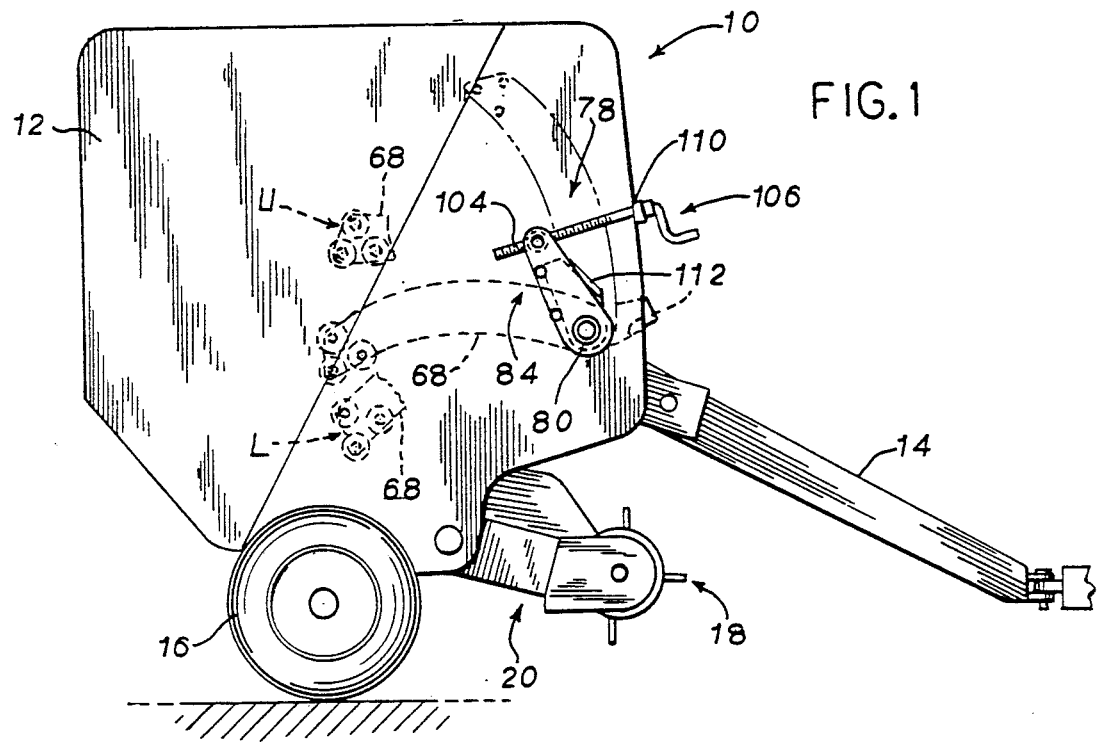
FIG. 1
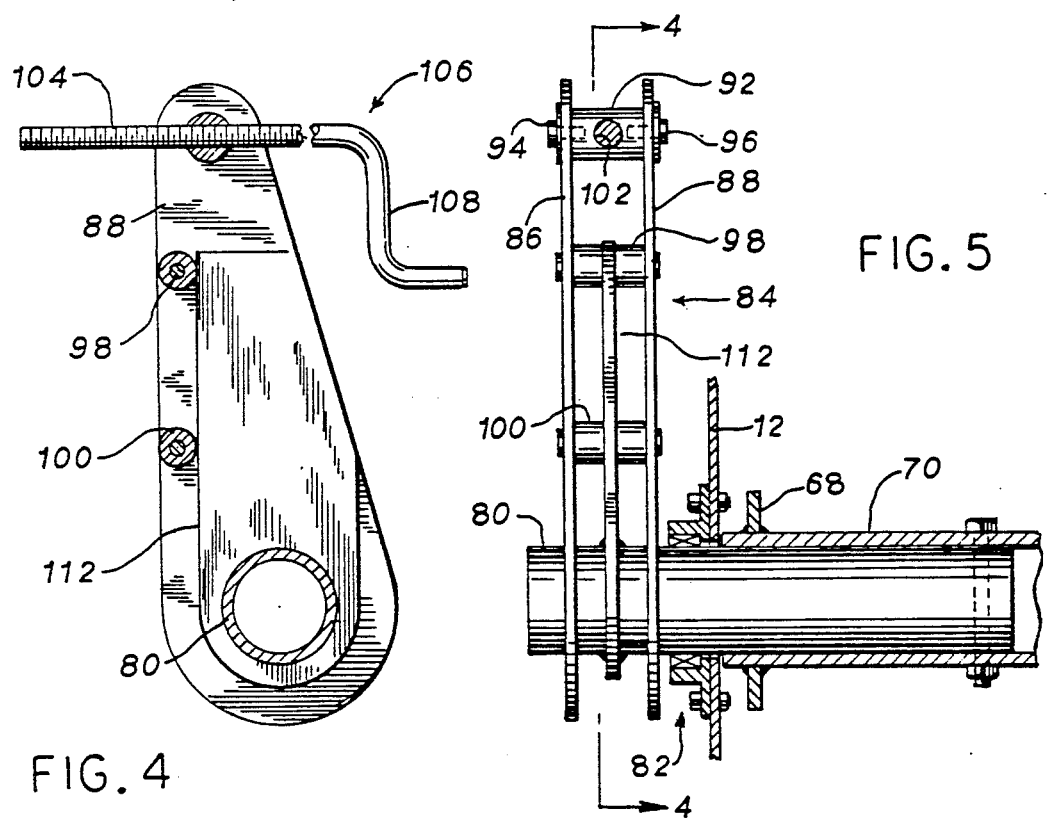
FIG. 4
FIG. 5

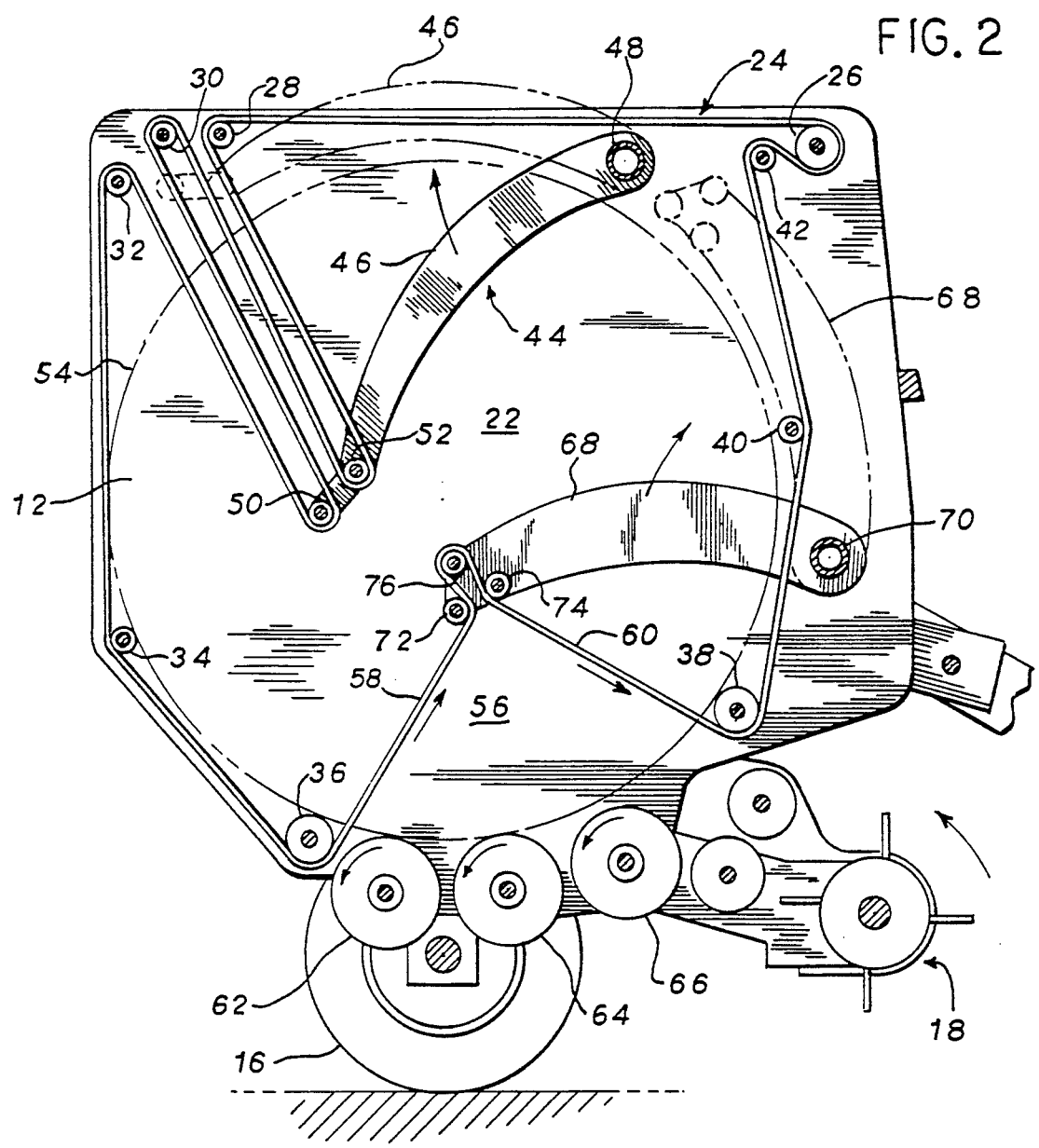
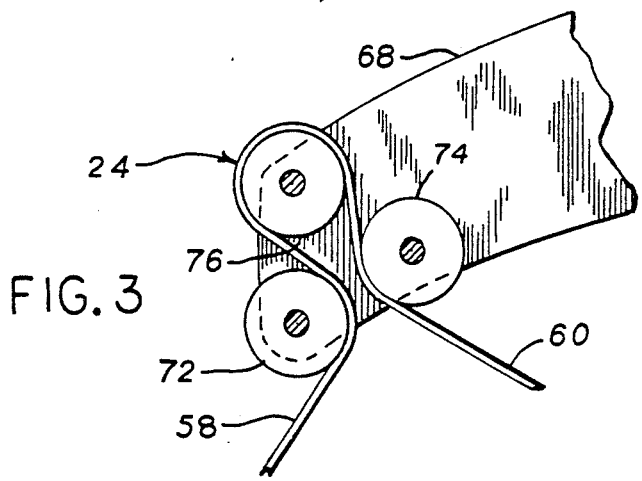

BELT TYPE ROUND BALER WITH ADJUSTABLE BALE STARTING CHAMBER

BACKGROUND AND SUMMARY

This invention relates to a baler for forming round bales of agricultural crop material, and more particularly to a variable chamber round baler having an open throat or starting chamber for assisting in starting the bale.

In a belt type variable chamber baler, a recognized problem is that of starting of the bale. Many systems have been developed to make starting of a round bale less difficult. Some such systems are shown in U.S. Pat. Nos. 4,782,652; 4,759,278; 4,422,373; and 4,648,239.

The above-noted patents disclose variable chamber belt-type balers in which the baler belts are trained around an upper stationary roller, which is located above the uppermost point of the bale after the bale is formed in the bale-forming chamber. In many of the noted patents, a pair of pivotable arms are mounted to the forward portion of the baler, and a pair of rollers are mounted between the arms. The rollers are mounted close together, and engage the baler belts below the stationary upper roller, to generally define an inverted V-shaped starting chamber for receiving crop material from the crop inlet of the baler at the outset of bale formation. The arms with the rollers extending therebetween act as part of the take-up mechanism for the baler belts, and pivot upwardly as the bale grows during bale formation.

A baler constructed as described above generally functions satisfactorily. However, one drawback is that the arms always return to a predetermined position, and thereby the size of the bale starting chamber is fixed.

It is an object of the present invention to provide a belt type variable chamber round baler having a starting chamber, and in which the size of the starting chamber can be adjusted by the operator. It is a further object of the invention to provide an adjustment feature which is simple in construction an operation, and which is readily incorporated into a conventionally constructed variable chamber baler.

The invention is employed in conjunction with a belt type round baler including a plurality of side-by-side baler belts which are disposed in a starting position prior to bale formation and in a finish position after bale formation. The invention comprises a mechanism for supporting the belts in the starting position to define a bale starting chamber for receiving crop material at the outset of bale formation, wherein the starting chamber is located between a pair of lower stationary baler rollers which define the crop inlet. The baler belts are supported above and between the pair of stationary baler rollers adjacent the crop inlet, and adjustment means is provided for adjusting the size of the bale starting chamber prior to bale formation. In one form of the invention, the belts are wrapped around one or more starting chamber rollers located above and between the pair of stationary baler rollers, and the adjustment means provides adjustability of the position of the one or more rollers prior to bale formation. The starting chamber rollers are mounted between the inner ends of a pair of arms, which are pivotably mounted at their outer ends to the baler, for providing moveable mounting of the starting chamber rollers to the baler. The adjustment means is interconnected with the arms, and is operable to pivot the arms to a selected position prior to bale formation, for providing adjustment in the size of the bale starting chamber.

The invention further contemplates a method of adjusting the size of bale starting chamber, substantially in accordance with the foregoing summary.

The adjustability in the size of the bale starting chamber allows the baler operator to provide the proper size of starting chamber in accordance with the crop material being baled. For light fluffy crops, it is preferable to increase the size of the bale starting chamber to provide ease in forming the crop core before the bale-forming chamber begins to expand. For heavier, more dense crops, the size of the starting chamber is decreased, for the same reason.

In accordance with another aspect of the invention, the baler belts are supported between the pair of lower baler rollers adjacent the crop inlet solely by the starting chamber rollers. That is, the baler belts are not wrapped around any of the stationary baler rollers between the baler rollers forming the crop inlet.

Various other objects, features and advantages of the invention will be made apparent from the following description, taken together with the drawings.

BRIEF DESCRIPTION OF THE DRAWINGS

The drawings illustrate the best mode presently contemplated of carrying out the invention.

In the drawings:

FIG. 1 is a side elevation view of a variable chamber round baler incorporating the starting chamber rollers and the adjustment mechanism of the invention;

FIG. 2 is a vertical section view through the baler of FIG. 1, showing the starting chamber rollers in greater detail, and one of the arms to which the starting chamber rollers are mounted;

FIG. 3 is an enlarged partial elevation view showing the starting chamber rollers mounted to one of the arms;

FIG. 4 is a side elevation view of a bracket member connected to the end of a pivot shaft to which the arms supporting the starting chamber rollers are mounted, and constituting part of the adjustment mechanism of the invention, reference being made to line 4—4 of FIG. 5; and FIG. 5 is a partial end elevation view showing the bracket member of FIG. 4 as mounted to the pivot shaft.

DETAILED DESCRIPTION OF THE PREFERRED EMBODIMENT

Referring to FIG. 1, a belt type variable chamber baler 10 generally includes a pair of side panels, one of which is shown at 12, spaced apart from each other and assembled to a frame assembly. Baler 10 is adapted to be pulled behind a tractor or the like by connection of a hitch bar 14 to the tractor hitch, and is supported by a pair of ground engaging wheels 16. A crop pickup mechanism 18 is rotatably mounted to a support assembly 20 provided at the lower front portion of baler 10, for picking up windrowed crop material and feeding it rearwardly toward the crop inlet of baler 10. These components of baler 10, and their operation, are all well known.

Referring to FIG. 2, an internal bale-forming chamber 22 is provided between the baler side panels 12, and a series of side-by-side baler belts 24 are wrapped around a series of stationary baler rollers rotatably supported between baler side panels 12. The stationary rollers include a drive roller 26 driven in response to input power supplied through the tractor power take-off mechanism, and a series of idler rollers 28, 30, 32, 34, 36, 38, 40 and 42.

A take-up mechanism 44 includes a pair of arms 46 pivotably mounted between the baler side panels 12 by means of a pivot shaft 48. A pair of take-up idler rollers, 50, 52 are rotatably supported between the ends of arms 46.

In accordance with known operation of a variable chamber round baler, take-up mechanism 44 pivots in a clockwise direction to accommodate an increase in the size of the bale formed within bale forming chamber 22, until the phantom line position of arms 46 is attained. In this position, the bale is of a size shown in phantom lines at 54.

Crop material from the crop windrow is fed rearwardly by operation of pickup assembly 18 into the crop inlet of baler 10, which is located between idler rollers 36 and 38. A starting chamber 56 is located between rollers 36 and 38, and is defined by runs 58 and 60 of baler belts 24.

A series of floor rollers 62, 64 and 66, are located below starting chamber 56 and rotate in a counterclockwise direction during operation of baler 10. Baler belt runs 58 and 60 move in the direction of the arrows shown adjacent each run, cooperating with floor rollers 62-66 to rotate the crop material clockwise to form a core of crop material.

A pair of support arms 68 are pivotally mounted adjacent side panels 12 of baler 10 by connection of the outer ends of arms 68 to a pivot shaft 70. Pivot shaft 70 is pivotally mounted at its ends to baler side panels 12. A series of starting chamber rollers 72, 74, and 76 are rotatably mounted between the inner ends of arms 68. Rollers 72, 74 and 76 support belts 24 above floor rollers 62-66, to define starting chamber 56. Belts 24 are wrapped over upper central roller 76 and between the facing surfaces of lower end rollers 72, 74. With this arrangement, belts 24 are supported between baler rollers 36, 38 solely by starting chamber rollers 72-76 without wrapping of belts 24 around any of the stationary baler idler rollers.

Arms 68 are shown in solid lines in FIG. 2 in their starting position, and are biased to the position shown by any conventional biasing means such as a torsion spring or a conventual coil-type spring. As the bale increases in size and engages runs 58 and 60 of belts 24, arms 68 pivot in a clockwise direction about pivot shaft 70, ultimately assuming the position shown in phantom lines when the bale is fully formed.

Referring to FIGS. 1, 4 and 5, an adjustment mechanism shown generally at 78 is mounted to baler 10, for providing pivoting movement of arms 68 prior to bale formation. Adjustment mechanism 78 is operable to pivot arms 68 to a selected position, thereby providing adjustability in the size of bale starting chamber 56.

Referring to FIG. 5, an extension 80 is bolted to tubular pivot shaft 70, with extension 80 being pivotably mounted to baler side panel 12 through a bearing assembly shown generally at 82. Accordingly, the end of extension 80 projects exteriorly of bale forming chamber 22.

A bracket assembly 84 is rotatably mounted to extension 80. Bracket assembly 84 includes a pair of plates 86 and 88 with openings therein to receive extension 80. Between the upper ends of plates 86 and 88, a tubular member 92 is rotatably supported by a pair of threaded connectors 94 and 96. In a similar manner, a pair of engagement members 98, 100 extend between plates 86 and 88.

Tubular member 92 includes a threaded opening 102 through its sidewalls, which receives a threaded shaft 104 associated with a crank member 106, which is provided with a handle portion 108. Crank member 106 is rotatably supported by a support member 110 mounted between the front surfaces of side panels 12.

A plate member 112 is rigidly connected to extension 80 between plates 86, 88 of bracket assembly 84. Prior to bale formation, the rear edge of plate member 112 is maintained in engagement with engagement members 98, 100 by the counterclockwise biasing of arms 68.

When crank member 106 is turned so as to move bracket assembly 84 counterclockwise about extension 80 to its fullest extent, the counterclockwise biasing of arms 68 results in starting chamber rollers 72-76 being moved to their lowermost position. In FIG. 1, the end of arms 68 and rollers 72-76 are shown in their lowermost position at L. When crank member 102 is turned so as to draw bracket assembly 84 in a clockwise direction about extension 80, engagement members 98, 100 act to engage plate member 90 and rotate it clockwise against the biasing force of arms 68, resulting in raising of arms 68 and starting chamber rollers 72-76. This increases the size of bale starting chamber 56. In FIG. 1, the end of arms 68 and starting chamber rollers 72-76 are shown in their uppermost position at U.

As the bale is formed in chamber 22, plate member 112 pivots clockwise along with shaft 70 and extension 80, until the dotted line position of FIG. 1 is attained. Bracket assembly 84 remains stationary. After the bale is fully formed and discharged from chamber 22, arms 68 are biased counterclockwise until engagement of plate member 112 with engagement members 98, 100, which places starting chamber rollers 72-76 in their starting position.

A prototype of baler 10 has been constructed, and provides a range of adjustability to arms 68 between a lower position in which a twelve inch bale core is formed and an upper position in which a thirty six inch bale core is formed. This corresponds to a range of adjustment of arms 68 of approximately forty to forty five degrees, accomplished through operation of adjustment mechanism 78 prior to bale formation according to the type of crop being baled and the conditions of the crop.

Various alternatives and embodiments are contemplated as being within the scope of the following claims particularly pointing out and distinctly claiming the subject matter regarded as the invention.

We claim:

1. A round baler for forming round bales of crop material, comprising:

a plurality of side-by-side trained around a plurality of rollers and cooperating to define a bale-forming chamber, the belts being movable between a starting position and a finish position, with the belts being trained around a forward baler roller and a rear baler roller which define a crop inlet to the bale-forming chamber;

a mechanism for supporting the belts above and between the pair of rollers defining a crop inlet to the bale-forming chamber to define a bale starting chamber therebelow when the belts are in their starting position, comprising a pair of arms to which at least one roller is mounted, wherein each of the side-by-side belts is trained about the at least one roller between the forward baler roller and the rear baler roller and is solely supported by the at least one roller therebetween, and wherein each of the side-by-side belts defines a first run extending between the rear baler roller and the at least one roller and a second run extending between the forward baler roller and the at least one roller, and wherein the bale starting chamber is defined by the first and second runs of the side-by-side belts; and adjustment means for varying the position of the at least one roller prior to the bale formation, to vary the volume of the bale starting chamber.

2. The baler of claim 1, wherein the adjustment means comprises means for pivoting the arms to a selected position prior to bale formation, to thereby move the at least one roller to a selected position.

3. The baler of claim 2, wherein the pair of arms are connected at their outer ends to a shaft.

4. The baler of claim 1, wherein the at least one roller comprises a pair of lower end rollers and a central upper roller, and wherein the baler belts are wrapped over the upper roller and are located between the pair of lower end rollers.

5. In a belt-type round baler for forming round bales of crop material and including a plurality of stationary baler rollers and a plurality of side-by-side baler belts engaged with the baler rollers and cooperating to define a bale forming chamber, in which the belts are disposed in a starting position prior to bale formation and in a finish position after bale formation, the improvement comprising a mechanism for supporting the belts in the starting position to define a bale starting chamber for receiving crop material from the crop inlet of the baler at the outset of bale formation, wherein the starting chamber is located between a rear stationary baler roller and a forward stationary baler roller which define the crop inlet, comprising:
 a pair of supporting arms movably mounted to the baler above the pair of stationary baler rollers; and
 at least one support roller rotatably mounted to the supporting arms, wherein the belts are wrapped around the at least one support roller between the rear and forward stationary baler rollers and are solely supported thereby between the rear and forward stationary baler rollers defining the crop inlet without support by the stationary baler rollers between the rear and forward stationary baler rollers.

6. The improvement of claim 4, wherein the arms are mounted for pivoting movement to the baler.

7. The improvement of claim 6 wherein the arms are mounted at their outer end to a shaft defining the pivot axis of the arms, and wherein the at least one support roller extends between the arms adjacent the inner end of the arms.

8. The improvement of claim 7, wherein the at least one support roller comprises a set of three rollers rotatably mounted adjacent the inner ends of the supporting arms, with the support rollers being arranged so as to provide a pair of lower end rollers and a central upper roller having its axis of rotation located between the axes of rotation of the lower rollers, with the belts being wrapped over the upper roller and located inwardly of the end rollers.

9. The improvement of claim 5, further comprising adjustment means for adjusting the position of the supporting arms, and thereby the position of the at least one support roller, prior to bale formation for varying the volume of the bale starting chamber.

10. The improvement of claim 9, wherein the at least one support rollers extends between the inner ends of the arms, and wherein the arms are mounted to the baler for pivoting movement adjacent their outer ends.

11. The improvement of claim 10, wherein the means for adjusting the position of the supporting arms comprises means for pivoting the arms about their pivot axes to a selected position, thereby causing movement of the at least one support rollers to a selected position and adjusting the volume of the starting chamber.

12. The improvement of claim 11, wherein the arms are mounted to a shaft pivotably connected to side panels associated with the baler, with one end of the shaft extending outwardly of one of the baler side panels, and wherein the means for moving the arms comprises a bracket assembly pivotably mounted to the shaft exteriorly of the baler side panel, a plate member fixed to the shaft and engageable with the bracket assembly, and an adjustment mechanism interconnected with the baler and with the bracket assembly at a point offset from the pivot axis of the shaft.

13. The improvement of claim 12, wherein the adjustment mechanism comprises a threaded crank member interconnected with the baler and with the bracket assembly so that the bracket assembly is moveable in response to rotation of the crank member, to thereby selectively impart rotation to the shaft through engagement of the bracket assembly with the plate member and to selectively position the pair of arms.

14. In a belt type round baler for forming round bales of crop material and including a plurality of stationary baler rollers and a plurality of side-by-side baler belts engaged with the baler rollers and cooperating to define a bale forming chamber, in which the belts are disposed in a starting position prior to bale formation and in a finish position after bale formation, the improvement comprising a mechanism for supporting the belts in the starting position to define a bale starting chamber for receiving crop material at the outset of bale formation, wherein the starting chamber is located between a rear lower stationary baler roller and a forward lower stationary baler roller defining the crop inlet of the baler, comprising:
 supporting structure movably mounted to the baler;
 a plurality of starting chamber rollers rotatably mounted to the supporting structure, wherein the belts are wrapped around the starting chamber rollers and are solely supported thereby between the rear lower baler roller and the forward lower baler roller defining the crop inlet without support by the stationary baler rollers between the rear and forward stationary rollers; and
 adjustment means for moving the supporting structure to a selected position for adjusting the position of the starting chamber rollers prior to bale formation, for varying the volume of the bale starting chamber.

15. A round baler for forming round bales of crop material, comprising:
 a plurality of side-by-side belts trained around a plurality of rollers and defining a bale-forming chamber, the belts being movable between a starting position and a finish position, with the belts being trained around a pair of rollers defining the crop inlet to the bale-forming chamber;

a mechanism for supporting the belts above and between the pair of rollers defining the crop inlet to the bale-forming chamber to define a bale starting chamber therebelow; and an adjustment mechanism for varying the position of the belt-supporting mechanism prior to bale formation, to vary the volume of the bale starting chamber, wherein the adjustment mechanism is interconnected with the belt supporting mechanism to provide adjustment of the bale-supporting mechanism between an uppermost starting position and a lowermost starting position, and wherein the adjustment mechanism provides infinitely variable positioning of the bale-supporting mechanism between the uppermost starting position and the lowermost starting position.

* * * * *

UNITED STATES PATENT AND TRADEMARK OFFICE
CERTIFICATE OF CORRECTION

PATENT NO. : 5,138,942

DATED : August 18, 1992

INVENTOR(S) : STEVEN J. HENDERSON ET AL

It is certified that error appears in the above-identified patent and that said Letters Patent is hereby corrected as shown below:

On cover page, item [75]

Change "Curtis" to -- Curtiss --.

In The Claims

CLAIM 1, Col. 4, Line 56, after "side-by-side" insert -- belts --; CLAIM 1, Col. 4, Line 64, after "defining" delete "a" and substitute therefor -- the --; CLAIM 1, Col. 5, Line 12, after "to" delete "the"; CLAIM 3, Col. 5, Line 19, after "shaft" insert -- extending between the sides of the baler, and wherein the means for pivoting the arms to a selected position comprises a bracket assembly pivotably mounted to the shaft and engageable with a plate member fixed to the shaft, and an adjustment mechanism operable on

UNITED STATES PATENT AND TRADEMARK OFFICE
CERTIFICATE OF CORRECTION

PATENT NO. : 5,138,942
DATED : August 18, 1992
INVENTOR(S) : STEVEN J. HENDERSON ET AL It is certified that error appears in the above-identified patent and that said Letters Patent is hereby corrected as shown below:

the bracket assembly to provide pivoting movement of the shaft upon engagement of the bracket assembly with the plate member --; CLAIM 6, Col. 5, Line 50, delete "4" and substitute therefor -- 5 --; CLAIM 11, Col. 6, Line 12, delete "rollers" and substitute therefor -- roller --; CLAIM 14, Col. 6, Line 55, after "forward" insert -- lower --.

Signed and Sealed this

Twenty-fourth Day of August, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,138,942
DATED : August 18, 1992
INVENTOR(S) : STEVEN J. HENDERSON ET AL It is certified that error appears in the above-identified patent and that said Letters Patent is hereby corrected as shown below:

On the Title page,
Please change inventors as follows:

item [75] Inventors: Steven J. Henderson, of Hartford, Wisconsin, and Curtiss M. Lee, of Madison, South Dakota --

Signed and Sealed this

Nineteenth Day of October, 1993

Attest:

BRUCE LEHMAN

Attesting Officer        Commissioner of Patents and Trademarks